Oct. 7, 1930.    R. ADAMS    1,777,284
PAN LIFTER
Filed Jan. 24, 1930
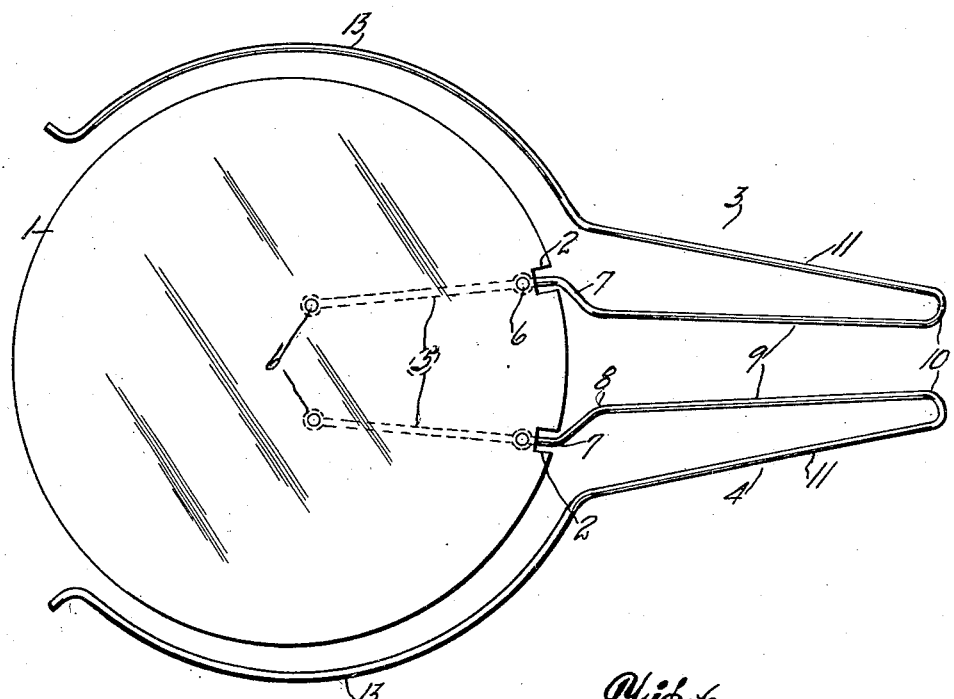
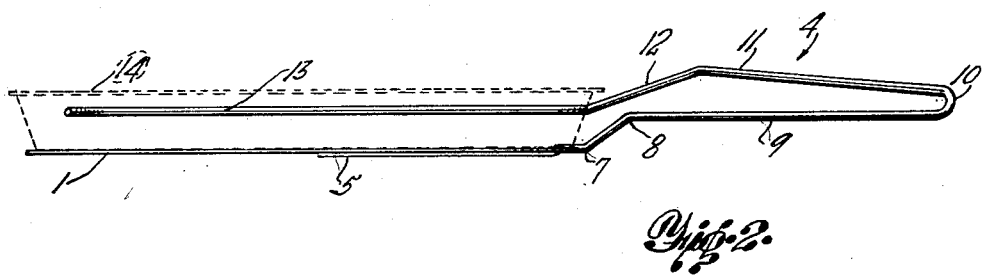
Inventor
Ray Adams
By Adam E. Fisher
Attorney Patented Oct. 7, 1930

1,777,284

UNITED STATES PATENT OFFICE

RAY ADAMS, OF GREAT FALLS, MONTANA

PAN LIFTER

Application filed January 24, 1930. Serial No. 423,002.

This invention relates to pan lifters.

The main object of the invention is to provide a simple, cheap and efficient device for lifting hot pans, plates or other utensils from ovens or the like without burning the hands.

Another object is to provide a pan lifter having a lifting plate to be inserted under the bottom of the utensil to support the same and having jaws adapted to engage the sides of the utensil to hold the same upon the lifting plate.

With these and other objects in view as will appear hereinafter the invention resides in the novel construction and arrangement of parts as hereinafter set forth and claimed.

In the drawing:

Figure 1 is a plan view of the pan lifter.

Figure 2 is a side view thereof, also showing a pan in broken lines in place upon the lifter.

Referring now more particularly to the drawing the reference numeral 1 designates a lifting plate preferably circular in plan and formed of thin sheet metals the said plate 1 being provided with two small spaced notches 2 in its periphery. The handle is formed of two identical sections designated generally at 3 and 4 which are constructed of wire of any desired gauge, each section 3 and 4 being formed of a single length of the wire. In forming the handle the wires forming the sections 3 and 4 are flattened at 5 adjacent one end and secured in spaced relationship to the underside of the plate 1 by rivets 6 or analogous fastening means, the said wires being bent angularly upward at 7 at the edge of the plate 1 to the point 8 and then extended horizontally outward from the plate 1 as at 9 in spaced relationship. The wires are then bent outwardly and upwardly upon themselves at 10 and extended back toward the plate 1 to form the hand portions 11 which are disposed angularly alongside the horizontal portions 8 of the wire and at some distance above the plane thereof. The remaining portions of the wires are then bent angularly downward at 12 toward the plate 1 and are given an arcuate shape to form the utensil engaging jaws 13 which are supported somewhat above the plate 1 and laterally beyond the periphery thereof as shown in the drawing.

In use the plate 1 is inserted under the utensil or dish to be lifted as shown in Figure 2, the utensil in this view being shown in the dotted lines 14. The two handle sections 3 and 4 are then grasped in the hand and the hand portions 11 are forced together by the thumb and fore-finger of the hand bring the jaws 13 into engagement with the utensil 14 to hold the same in place on the plate 1. The wires forming the handle sections 3 and 4 are preferably of a resilient character so that when the inward pressure upon the hand portions 12 is released they will regain their former position though this action is possible even though the wire is not resilient or spring-like.

While I have herein set forth a certain preferred embodiment of my invention it is understood that I may vary from the same in minor structural details, not departing from the spirit of the invention and within the scope of the appended claims.

I claim:

1. In a device of the kind described, a flat lifting plate, and a handle comprising two similar sections secured to the plate and formed to provide two hand portions and connected jaws whereby the jaws may be caused to engage an utensil on the lifting plate by pressing inward upon the said hand portions.

2. In a device of the kind described, a flat lifting plate, a handle comprising two sections each formed of a single length of wire flattened at its ends and secured to the lifting plate, the wire being then bent upwardly and outwardly from the plate for some distance and then bent upwardly and outwardly upon itself and extended back toward the plate to form a hand portion, the end of the wire forming each handle section being arcuately formed and disposed adjacent to and above the lifting plate whereby the wires of the two sections will serve as jaws to engage an utensil supported upon the said plate.

In testimony whereof I affix my signature.

RAY ADAMS.